United States Patent [19]

Lehmann et al.

[11] Patent Number: 5,431,708
[45] Date of Patent: Jul. 11, 1995

[54] PROCESS FOR PREVENTING A FORMATION OF DUST DURING THE LOADING AND SHIPPING OF SULFATE FERTILIZER GRANULATES

[75] Inventors: Gerhard Lehmann, Fuldatal; Otto Wendt, Philippsthal; Wolfgang Walczyk, Hohenroda, all of Germany

[73] Assignee: Kali und Salz AG, Kassel, Germany

[21] Appl. No.: 127,643

[22] Filed: Sep. 28, 1993

[30] Foreign Application Priority Data

Sep. 29, 1992 [DE] Germany ............. 42 32 567.6

[51] Int. Cl.$^6$ ............. C05C 9/00; C05G 5/00
[52] U.S. Cl. ............. 71/28; 71/64.07; 71/64.12; 71/64.13; 71/63
[58] Field of Search ............. 71/28–30, 71/64.01, 64.02, 64.11, 64.12, 64.13, 64.07

[56] References Cited

U.S. PATENT DOCUMENTS

| 3,725,029 | 4/1973 | Blackmore ............. 71/64.12 |
| 5,238,480 | 8/1993 | Rehberg et al. ............. 71/64.07 |

FOREIGN PATENT DOCUMENTS

| 1012932 | 8/1957 | Germany . |
| 1242249 | 6/1967 | Germany . |
| 2538276 | 6/1978 | Germany . |
| 136956 | 5/1980 | Germany . |
| 3003183 | 8/1981 | Germany . |
| 3918523 | 12/1990 | Germany . |

*Primary Examiner*—Ferris Lander
*Attorney, Agent, or Firm*—Collard & Roe

[57] ABSTRACT

A process for preventing the formation of dust during the loading of sulfate fertilizer granulates includes spraying a high-percent aqueous solution of urea onto the fertilizer granulates. The amount of aqueous solution sprayed ranges from 4 to 8 kg of solution per ton of granulate. The concentration of urea within the solution is between 50% and 80% by weight.

5 Claims, No Drawings

PROCESS FOR PREVENTING A FORMATION OF DUST DURING THE LOADING AND SHIPPING OF SULFATE FERTILIZER GRANULATES

BACKGROUND OF THE INVENTION

1. Field of the Invention

The present invention relates to a process for preventing a formation of dust during the loading and shipping of sulfate fertilizer granulates.

2. The Prior Art

Fertilizers are manufactured to an increasing extent in the granulated form and shipped in loose bulk. In order to produce the granulates, dry pressing granulation is used extensively. This shapes the salt particles into shells, from which granulates are subsequently produced by crushing the shells. After screening, the granulates are preferably in the grain size range of 1.0 to 4.0 mm.

It is known to add auxiliary granulating agents to the starting mixture of fine-grained substances which are granulated to produce granulates. Thus, for example, German Patent No. 1,242,249 discloses a process for the production of granulated mixed fertilizers from calcium cyanamide and potash fertilizer with solid urea or urea nitrate as an auxiliary agent in roll presses, whereby about 3% solid urea is used with the other starting materials. In addition to the pressing process, build-up granulation (also roll granulation) is widely used as well.

For example, according to German Patent 1,012,932, lime mixed with a nitrogen-containing fertilizer is dry mixed with urea and is then granulated with 2% to 10% water, and subsequently dried. The granulates produced by pressing have sharp corners and edges caused mainly by the subsequent crushing process, which are rubbed off during the shipping or transloading of the material. Then, during the shipping and during the further use of the granulates, this results in an undesirable formation of dust, causing an unacceptable polluting of the environment.

It is known that attempts have been made by the producer to counteract this pollution phenomenon by screening finest-grain prior to shipping. However, this type of after-treatment alone does not suffice to remove the adhering fine residual dust or to enhance the resistance to abrasion of the edges, corners and also sides of the granulate grain.

A process is known from German No. 136,956 for improving the resistance to abrasion of potash fertilizer granulates by subjecting such fertilizer to an after-treatment after the granulating process. This after-treatment includes dust removal in a fluidized bed, followed by a subsequent treatment of the granulate surface with water or aqueous additives, with downstream drying and cooling of the granulate so treated. The process is based on the possibility of eliminating still-present unstable points or edges by slight solubilizing and recrystallization, and of solidifying the granulate surface in this way.

German OS 3,003,183 discloses that at a temperature range of 80° C. to 100° C., the treatment method achieves an optimal gain in strength if a minimum residence time of 10 seconds under an atmosphere of high humidity is simultaneously used. The specified treatment method requires a high energy expenditure for the actual granulation and screening in the downstream plant and equipment. This process is only feasible by the producer, because the heat required for such process originates from the granulate production.

Consequently, this prior art method is not applicable for granulated potash products that have to be stored for a long period of time in intermediate storage facilities and then loaded again from there, in addition to the investment expenditure required and the maintenance cost involved. Further, disadvantages are due to the longer storage time and the physical process variables connected therewith, such as storage pressure and change in the atmospheric humidity. These can have negative effects on the treated granulates, such as a tendency to cake together and a softening of the grain.

Additional use has been made of dust-bonding agents, for example, mostly organic substances, which are added to the granulate in small quantities, so that a protective cover is produced and dusting is strongly reduced. A mixture of soft paraffin and spindle oil has been used for this purpose in German 2,538,276.

In German OS 3,918,523, a solution of molasses and another oxygen-containing hydrocarbon such as glycerin, polyethylene glycol, and triethanolamine is sprayed onto a fertilizer granulate, in particular onto potassium sulfate, for bonding the dust.

However, other types of substances have been proposed. For the most part, these are foreign substances without fertilizing properties. Furthermore, they are now increasingly deemed ecologically undesirable because they may lead to, for example, annoying odor or, in the case of fertilizer, pollution of the ground water supply.

SUMMARY OF THE INVENTION

It is an object of the present invention to provide a process for preventing the formation of dust during the loading and shipping of fertilizer granulates which, in addition to the requirements that must be satisfied in general with respect to efficiency and simple handling, also is friendly to the environment.

A further object is to provide a process useful for dust prevention for sulfate fertilizers which utilizes as dust prevention agent a substance which is itself used in large quantities as a fertilizer in granulate form, namely, urea having the chemical formula $NH_2-CO-NH_2$.

The above objects are accomplished by providing a process for the prevention of dust formation during the loading and shipping of sulfate fertilizer granulates comprising spraying a high-weight percent aqueous urea solution as the dust-bonding agent onto the granulates at temperatures greater than 30° C., in an amount of 4 to 8 kg of agent solution per ton of granulate.

It is preferable to spray agent solutions having concentrations of urea between 50% and 80% by weight based upon the total weight of the aqueous solution. Concentrations of from 60% to 67% by weight of urea have been found to be particularly preferred, based upon the total weight of the aqueous solution. The temperature of the aqueous solution is preferably between 45° C. and 65° C.

Potassium sulfate and magnesium sulfate are preferred as the fertilizer granulate to be utilized according to the process of the invention. The magnesium sulfate can be present as the monohydrate, $MgSO_4.H_2O$ kieserite. It is also possible to use granulated magnesia potash (patent potash), which is a mixture of $MgSO_4$ and $K_2SO_4$ with a $K_2O$ content of about 30% by weight ($K_2O$) and an MgO content of about 10% by weight (MgO).

The dust bonding property and activity achieved according to the invention is determined according to the following method. Samples of the granulate to be treated are freed by screening of any particles that might be adhering. Subsequently, the bonding agent to be tested is uniformly sprayed and distributed onto the samples, with each sample comprising 1000 g. Following this spray application, the samples are mixed by rotating each in a test flask or bottle for 5 minutes.

The samples so obtained are then tested, for example, after different storage times, by screening the entire content, in each case of one test bottle by using an Alpine air jet machine with an inserted 0.063 mm screen. The screening step lasts three minutes. Subsequently, the inserted and dust-loaded filter paper is either weighed or, with soluble dusts, the dust is washed out and the quantity is determined using titration. Based on the resulting value, the dust bonding is calculated in weight percent.

In the comparative tests listed in the following tables, 6 kg of bonding agent solution subsequently was sprayed in each case onto one ton of the potassium sulfate-pressed granulate at the specified temperatures.

DETAILED DESCRIPTION OF PREFERRED EMBODIMENTS

EXAMPLE 1

A $K_2SO_4$ granulate has the following chemical analysis:

|  | % by weight |
|---|---|
| $K_2SO_4$ | 93.6 |
| KCl | 0.9 |
| $MgSO_4$ | 1.7 |
| $MgCl_2$ | 0.1 |
| NaCl | 0.6 |
| $Ca_{SO4}$ | 1.0 |
| $H_2O$ | 2.0 |
| Insoluble matter | 0.1 | and the following screen analysis:

|  | % by weight |
|---|---|
| +4.0 mm | — |
| +3.15 mm | 11 |
| +2 mm | 71 |
| +1.6 mm | 13 |
| +0.8 mm | 4 |
| −0.8 mm | 1 |

6 g of an aqueous solution at a different concentration is sprayed onto 1000 g of this granulate at a temperature of 45° C.

The results of the dust-bonding tests and a comparison with the untreated sample are shown in Table 1.

Example 2

A kieserite granulate has the following chemical analysis:

|  | % by weight |
|---|---|
| $MgSO_4$ | 76.4 |
| $K_2SO_4$ | 0.3 |
| KCl | 3.6 |
| $MgCl_2$ | 0.4 |
| NaCl | 2.6 |
| $Ca_{SO4}$ | 1.1 |
| $H_2O$ | 15.3 |
| Insoluble matter | 0.3 | and the following screen analysis:

|  | % by weight |
|---|---|
| +4.0 mm | 23 |
| +3.15 mm | 30 |
| +2 mm | 40 |
| +1.6 mm | 5 |
| +0.8 mm | 1 |
| −0.8 mm | 1 |

6 g of an aqueous solution at a different concentration is sprayed onto 1000 g of this granulate at a temperature of 30° C.

The results of the dust-bonding tests and a comparison with the untreated sample are shown in Table 2.

Example 3

A magnesia potash granulate has the following chemical analysis:

|  | % by weight |
|---|---|
| $MgSO_4$ | 30.8 |
| $K_2SO_4$ | 50.0 |
| KCl | 5.0 |
| $MgCl_2$ | — |
| NaCl | 0.3 |
| $Ca_{SO4}$ | 2.0 |
| $H_2O$ | 11.7 |
| Insoluble matter | 0.2 | and the following screen analysis:

|  | % by weight |
|---|---|
| +4.0 mm | 5 |
| +3.15 mm | 17 |
| +2 mm | 47 |
| +1.6 mm | 19 |
| +0.8 mm | 11 |
| −0.8 mm | 1 |

6 g of an aqueous urea solution at a different concentration is sprayed onto 1000 g of this granulate at a temperature of 30° C.

The results of the dust-bonding tests and a comparison with the untreated sample are shown in Table 3.

TABLE 1

Dust-bonding tests on granulated potassium sulfate

|  | o-value untreated | +6 kg/t 60% urea | +6 kg/t 65% urea | +6 kg/t 70% urea |
|---|---|---|---|---|
| after 1 week: |  |  |  |  |
| <63 μm | 143 | 62 | 56 | 63 |
| after 5 min shaking | 146 | 52 | 36 | 53 |
| % dust bonded | — | 61 | 68 | 60 |
| after 3 weeks: |  |  |  |  |
| <63 μm | 153 | 61 | 50 | 64 |
| after 5 min shaking | 155 | 38 | 43 | 47 |
| % dust bonded | — | 68 | 70 | 64 |
| after six weeks: |  |  |  |  |
| <63 μm | 153 | 65 | 67 | 79 |
| after 5 min shaking | 146 | 52 | 44 | 74 |

TABLE 1-continued

Dust-bonding tests on granulated potassium sulfate

|  | o-value untreated | +6 kg/t 60% urea | +6 kg/t 65% urea | +6 kg/t 70% urea |
|---|---|---|---|---|
| % dust bonded | — | 61 | 63 | 49 |

TABLE 2

Dust-bonding tests on granulated kieserite

|  | (1) zero-value | (2) 60% urea sol. +6.0 kg/t | (3) 65% urea sol. +6.0 kg/t | (4) 70% urea sol. +6.0 kg/t |
|---|---|---|---|---|
| after 1 week: | | | | |
| <63 μm | 114 mg/100 g | 58 mg/100 g | 41 mg/100 g | 43 mg/100 g |
| after 5 min shaking | 174 mg/100 g | 90 mg/100 g | 77 mg/100 g | 81 mg/100 g |
| % dust bonded | — | 49% | 60% | 58% |
| after 3 weeks: | | | | |
| <63 μm | 108 mg/100 g | 51 mg/100 g | 30 mg/100 g | 35 mg/100 g |
| after 5 min shaking | 196 mg/100 g | 114 mg/100 g | 94 mg/100 g | 109 mg/100 g |
| % dust bonded | — | 47% | 62% | 56% |
| after six weeks: | | | | |
| <63 μm | 90 mg/100 g | 56 mg/100 g | 43 mg/100 g | 50 mg/100 g |
| after 5 min shaking | 199 mg/100 g | 106 mg/100 g | 110 mg/100 g | 123 mg/100 g |
| % dust bonded | — | 43% | 49% | 41% |

TABLE 3

Dust-bonding tests on coarse magnesium potash

|  | o-value untreated | +6 kg/t 50% urea | +6 kg/t 60% urea | +6 kg/t 65% urea | +6 kg/t 70% urea |
|---|---|---|---|---|---|
| after 1 week: | | | | | |
| <63 μm | 174 | 37 | 32 | 28 | 27 |
| after 5 min shaking | 160 | 66 | 54 | 50 | 50 |
| % dust bonded | — | 69 | 74 | 77 | 77 |
| after 3 weeks: | | | | | |
| <63 μm | 158 | 55 | 60 | 56 | 66 |
| after 5 min shaking | 178 | 85 | 72 | 63 | 58 |
| % dust bonded | — | 59 | 61 | 65 | 63 |
| after six weeks: | | | | | |
| <63 μm | 189 | 45 | 45 | 40 | 48 |
| after 5 min shaking | 150 | 98 | 98 | 89 | 105 |
| % dust bonded | — | 56 | 56 | 60 | 53 |

Result Data in mg dust/100 g salt

While several embodiments of the present invention have been shown and described, it is to be understood that many changes and modifications may be made thereunto without departing from the spirit and scope of the invention as defined in the appended claims.

What is claimed is:

1. A process for preventing the formation of dust during the loading or shipping of sulfate fertilizer granulates, by applying an aqueous urea solution, consisting essentially of:

spraying the aqueous urea solution onto the granulates as a dust-bonding agent at a temperature of the solution between 45° C. and 70° C. in an amount of from 4 to 8 kg of solution per ton of granulate, and the concentration of the urea within the solution being between 50% and 80% by weight, based upon the total solution weight.

2. The process according to claim 1, wherein the concentration of the urea within the solution is between 60% and 67% by weight, based upon the total solution weight.

3. The process according to claim 1, wherein the sulfate fertilizer is a granulate selected from the group consisting of potassium sulfate, magnesium sulfate, and the mixtures thereof.

4. The process according to claim 3, wherein the fertilizer granulate is potassium sulfate.

5. The process according to claim 3, wherein the fertilizer granulate is $MgSO_4$ hydrate.

* * * * *